United States Patent [19]

Eppenbach

[11] 4,346,823
[45] Aug. 31, 1982

[54] MULTIPLE FUNCTION CLOSURE

[76] Inventor: Lawrence C. Eppenbach, 419 Kennedy St., Juneau, Ak. 99801

[21] Appl. No.: 174,884

[22] Filed: Aug. 4, 1980

[51] Int. Cl.³ .............................................. G01F 11/26
[52] U.S. Cl. .................................... 222/443; 222/456; 222/548
[58] Field of Search ............... 222/456, 457, 480, 485, 222/548, 565, 443

[56] References Cited

U.S. PATENT DOCUMENTS

| | | | |
|---|---|---|---|
| 3,185,357 | 5/1965 | Merkel | 222/443 X |
| 3,209,961 | 10/1965 | Wassell | 222/443 |
| 3,414,172 | 12/1968 | Souza | 222/443 |
| 3,486,665 | 12/1969 | Croce | 222/480 |
| 3,584,771 | 6/1971 | Wakamatsu | 222/457 |
| 3,836,055 | 9/1974 | Katzmark et al. | 222/456 |

Primary Examiner—Robert J. Spar
Assistant Examiner—Frederick R. Handren
Attorney, Agent, or Firm—Gordon L. Peterson

[57] ABSTRACT

A multiple function closure for attachment to a container for divided material, including a first cap having an end wall, a measuring unit attached to one side of the end wall and a second cap attached to the other side of the end wall. The first cap can be attached to the container so that the end wall closes the opening in the container. The second cap is rotatably mounted on the first cap and can selectively be placed in a closed position, a measured dispensing position and a non-measured dispensing position.

11 Claims, 5 Drawing Figures

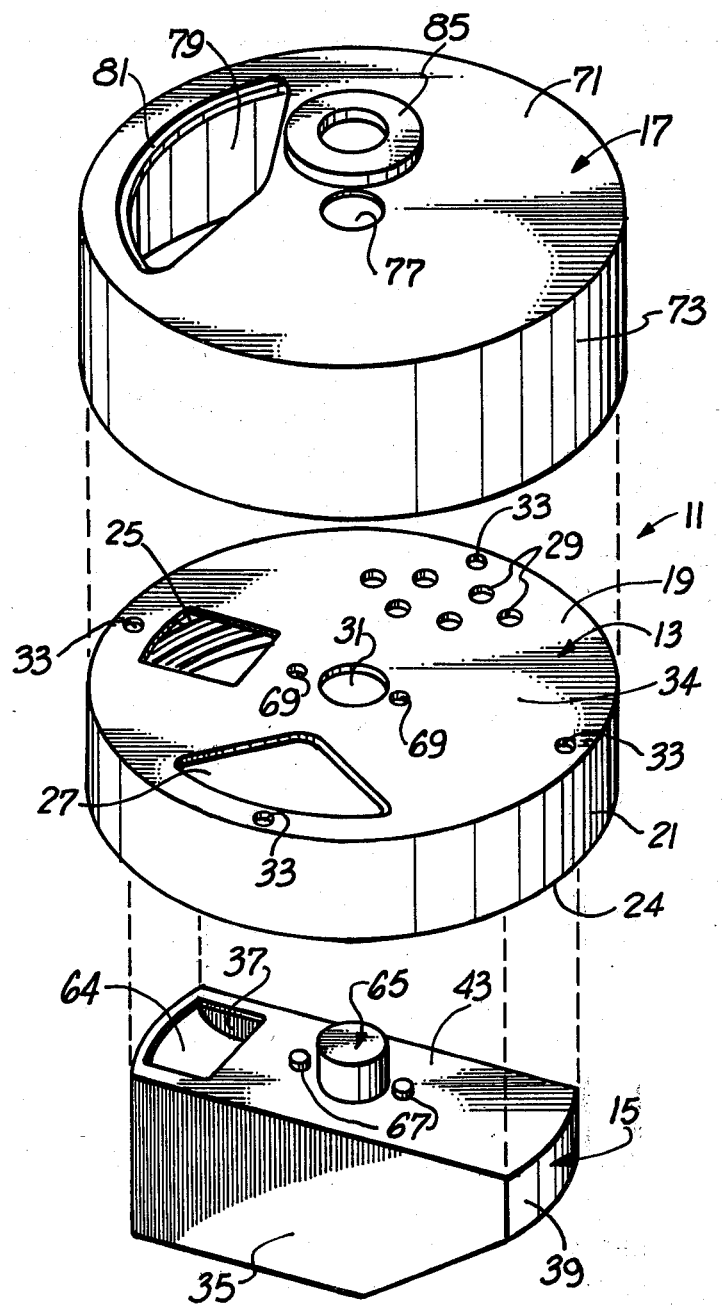

4,346,823

MULTIPLE FUNCTION CLOSURE

BACKGROUND OF THE INVENTION

This invention relates to closures for containers for divided material, such as flakes, powders or granules. For example, edible divided material, such as salt, sugar, coffee, spices, etc. are commonly dispensed from containers of this type.

A conventional spice container has a closure which permits the user to select either an open or closed position of the closure. In the open position, the spice may be shook through a multiplicity of small openings or poured through a larger opening.

Another form of closure for divided materials utilizes a measuring unit for measuring a predetermined volume of the divided material from within the container. For example, my prior application which has now issued into U.S. Pat. no. 4,201,320, provides a measuring dispenser for divided materials in which the measured quantity of the divided material can be varied by movement of a slide. My prior measuring dispenser is essentially a two-position dispenser in which the closure is either closed or made capable of dispensing a preset volume of divided material.

SUMMARY OF THE INVENTION

This invention provides a multiple-function closure which enables the user to select among closed and several different open positions. For example, this closure has a measured dispensing position in which a predetermined volume of divided material is dispensed and one or more other open positions in which non-measured quantities of divided material can be poured or shook from the container. This provides versatility not obtainable heretofore, and this is accomplished with a simple, inexpensive unit of novel construction.

The closure can advantageously include a first cap having an end wall and means for attaching the first cap to the container so that the end wall can at least partially span the opening of the container. The end wall has opening means therein.

A measuring unit which is responsive to its own orientation to provide a predetermined volume of the divided material is mounted on one side of the first cap. A first portion of the opening means communicates with the measuring unit so that the first portion can receive the predetermined volume of divided material from the measuring unit, and a second portion of the opening means is outside of the measuring unit in the sense that the second portion passes through the end wall so that the second portion cannot receive the predetermined volume of divided material from the measuring unit. The second portion of the opening means can include discrete openings that allow pouring or shaking of the divided material from the container and/or a larger opening which permits the insertion of a spoon or other implement into the container.

A second cap having an outlet therein is mounted on the other side of the first cap for movement relative to the first cap. This enables the second cap to be moved such that the outlet can be selectively placed in communication with the end wall to define a closed position, the first portion of the opening means to define a measured dispensing position, and the second portion of the opening means to define a non-measured dispensing position.

Although the closure can be attached to the container in different ways, it is preferred to provide a peripheral wall on the first cap for attaching the closure to the neck of the container. The measuring unit is surrounded by the peripheral wall and spaced radially therefrom to provide a gap for receiving the neck of the container. The area of the measuring unit in plan is less than the area of the end wall in plan so that a portion of the opening means in the end wall communicates with the measuring unit, and another portion of the opening means communicates with the interior of the container outside of the measuring unit.

The measuring unit is preferably mounted on the end wall of the first cap and should be essentially prevented from rotating relative to the first cap. This can be simply and inexpensively accomplished by providing a connector member and at least one pin on the measuring unit which project from the measuring unit into the first cap. The connector member and the pin prevent relative rotation between the measuring unit and the first cap. This same connector member can advantageously be used to rotatably mount the second cap on the first cap by extending the connector member through a central aperture in the second cap. With this arrangement, the second cap can be rotated among the various dispensing and non-dispensing positions.

A detent can advantageously be used for releasably retaining the second cap in any of the selected dispensing and non-dispensing positions. For example, the detent may include a projection on the second cap and one or more cooperating recesses on the first cap. The projection is preferably located generally opposite the outlet to urge the surfaces of the caps adjacent the outlet tightly together as the second cap is rotated from one of the positions. By forcing the surfaces of the caps tightly together, the likelihood of getting divided material between the surfaces is reduced. Also, by locating the projection on the second cap, the first cap can be a purchased unit which is die cut as desired.

Although the measuring unit could be of the type which permits adjusting of the measured volumes, for reasons of simplicity, it is preferred to have the measuring unit capable of dispensing only a single fixed volume of material. The measuring unit can advantageously be integrally molded from plastic material and folded about fold lines to its desired configuration. The measuring dispenser has an entrance passage for receiving the divided material and a discharge passage for discharging a measured amount of the divided material. To prevent entrapment of material within the measuring unit, the minimum dimension of the cross section of the entrance passage is preferably less than the minimum dimension of the cross section of the discharge passage.

The invention, together with further features and advantages thereof, may best be understood by reference to the following description taken in connection with the accompanying illustrative drawing.

BRIEF DESCRIPTION OF THE DRAWING

FIG. 5 is an exploded isometric view of the multiple-function closure.

DESCRIPTION OF THE PREFERRED EMBODIMENT

Figure 1:
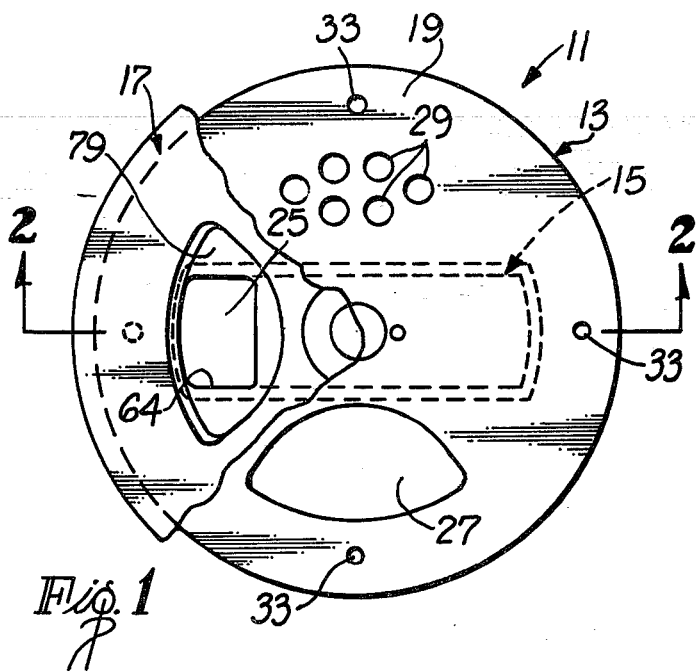
FIG. 1 is a top plan view of a closure constructed in accordance with the teachings of this invention with portions of the second or outer cap cut away and showing the closure in its measured dispensing position.
Figure 2:
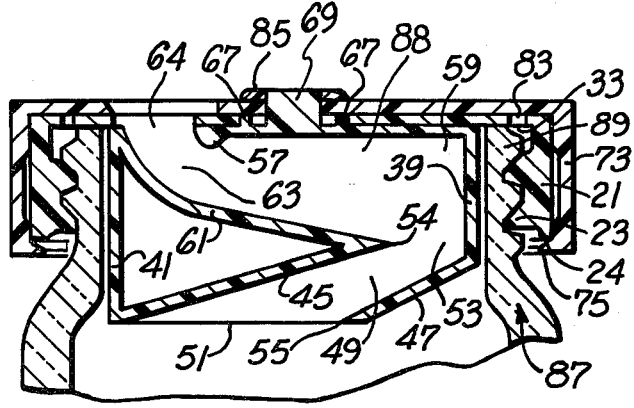
FIG. 2 is a fragmentary sectional view taken generally along line 2—2 of FIG. 1.
Figure 4:
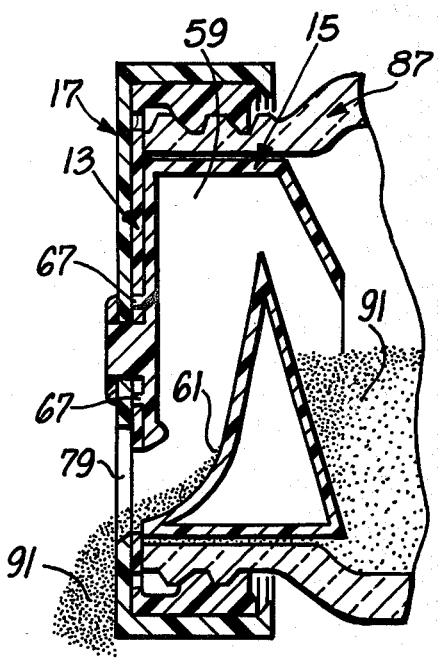
FIG. 4 is a fragmentary sectional view similar to FIG. 3 showing the measuring unit in the dispensing position.

The drawings show a multiple-function closure 11 which generally includes a first or inner cap 13, a measuring unit 15 and a second or outer cap 17. With particular reference to FIGS. 1, 2 and 5, the inner cap 13 includes an end wall 19 and a cylindrical peripheral wall or skirt 21 having interior screw threads 23 and a free edge 24. In a preferred construction, the inner cap 13 is integrally molded from a suitable plastic material. The size and configuration of the end wall 19 depends upon the size of the opening which is to be closed, and in the embodiment illustrated, the end wall 19 is circular and planar.

The end wall 19 has opening means which, in the embodiment illustrated, includes a measured dispensing opening 25, a pouring opening 27 and a group of relatively small shaker openings 29. The pouring opening 27 may be large enough to permit the insertion of a spoon or other implement therein. Although various arrangements are possible, in the embodiment illustrated, the central regions of the openings 25 and 27 and the central region of the group of openings 29 are spaced apart approximately 90 degrees.

The end wall 19 also has a non-circular, central aperture 31 at its center and four detent recesses 33 equally spaced adjacent the periphery of the end wall 19. Three of the detent recesses 33 are directly radially outwardly of the central region of the openings 25, 27 and 29, respectively, and the fourth of the recesses is centered on an imperforate region 34 of the end wall 19.

The measuring unit 15 is of the type which is responsive to its own orientation to provide a measured volume of divided material. Although different constructions are possible, the measuring unit 15 is of generally box-like construction and can advantageously be integrally molded from a suitable plastic material, such as ABS or polypropylene. The measuring unit 15 includes opposite side walls 35 and 37, opposite end walls 39 and 41 (FIGS. 2 and 5), and a top wall 43. The width of the top wall 43 is substantially less than the diameter of the end wall 19, and the length of the top wall 43 is somewhat less than the diameter of the end wall 19.

The measuring unit 15 includes integral baffles 45 and 47 (FIG. 2) which extend completely between the opposite side walls 35 and 37 and which converge as they extend inwardly of the measuring unit. The baffles 45 and 47 cooperate with the side walls 35 and 37 to define an entrance passage 49 which converges as it extends from an inlet 51 at the bottom of the measuring unit to a throat 53 which defines the minimum cross-sectional area and dimension of the entrance passage. Although various different configurations can be used, in the embodiment illustrated, each of the baffles 45 and 47 is in the form of a planar plate. The baffle 45 terminates inwardly in a linear baffle edge 54, and the baffle 47 terminates in a linear baffle edge 55 which, in the embodiment illustrated, lies below and to the left of the baffle edge 54.

The end wall 39, the top wall 43 and a projection 57 cooperate with the side walls 35 and 37 to define a receiving chamber 59 (FIG. 2). A sloping interior wall 61 and the projection 57 define a discharge passage 63. The minimum cross-sectional dimension of the discharge passage 63 is larger than the minimum cross-sectional dimension of the throat 53. The discharge passage has an outlet 64.

The measuring unit 15 has a connector member 65 and locator pins 67 integral with the top wall 43 and projecting upwardly therefrom. The connector member 65 is in the form of a cylindrical shaft which projects upwardly beyond the plugs 67. The connector member 65 is sized to be received within the aperture 31 to mount the measuring unit 15 on the inner cap 13, with the pins 67 being received in apertures 69 of the inner cap to essentially prevent relative rotation between the measuring unit and the inner cap. This also orients the measuring unit 15 angularly with respect to the inner cap 13 such that the outlet 64 is in registry with the measured dispensing opening 25. This also prevents incorrect assembly of the measuring unit 15 and the inner cap 13.

The outer cap 17 has a circular end wall 71, a cylindrical skirt or peripheral wall 73 and an in-turned lip or flange 75 (FIG. 2) which extends radially inwardly beneath and in engagement with the free end 24 of the peripheral wall 21. The end wall 71 has a central circular aperture 77 for receiving the connector member 65 to rotatably mount the outer cap 17 on the inner cap 13. The end wall 71 also has an outlet 79, with a beveled edge 81 and a detent projection 83 (FIG. 2) spaced 180 degrees from a central region of the outlet 79. The projection 83 projects axially inwardly from the inner face of the end wall 71, and is received within one of the detent recesses 33 to retain the outer cap 17 in the measured dispensing position shown in FIG. 2.

To mount the outer cap 17 for rotation on the inner cap 13, the connector member 65 projects through the aperture 77 and the central opening of a washer 85 of plastic material. The washer 85 is suitably attached as by sonic welding to the shaft section 69.

The closure 11 illustrated in the drawings is adapted for retrofit on an existing container 87, although it may be provided integrally with a container, if desired. The container 87 has an opening 88 surrounded by a threaded neck 89 on which the inner cap 13 is threadedly mounted with the neck being received between the measuring unit 15 and the peripheral wall 21.

In FIGS. 1–4, the outer cap 17 is in the measured dispensing position in which the outlet 79 is in registry with the outlet 64. The outer cap 17 can be rotated to other open positions in which the outlet 79 is in registry with the pouring opening 27 or the group of shaker openings 29. Alternatively, the cap 17 can be rotated 180 degrees from the position shown in FIG. 1 to a closed position in which the outlet 79 is completely closed by the imperforate region 34 of the end wall 19 of the inner cap 13. The projection 83 is received within one of the recesses 33 in each of the four positions identified above.

Figure 3:
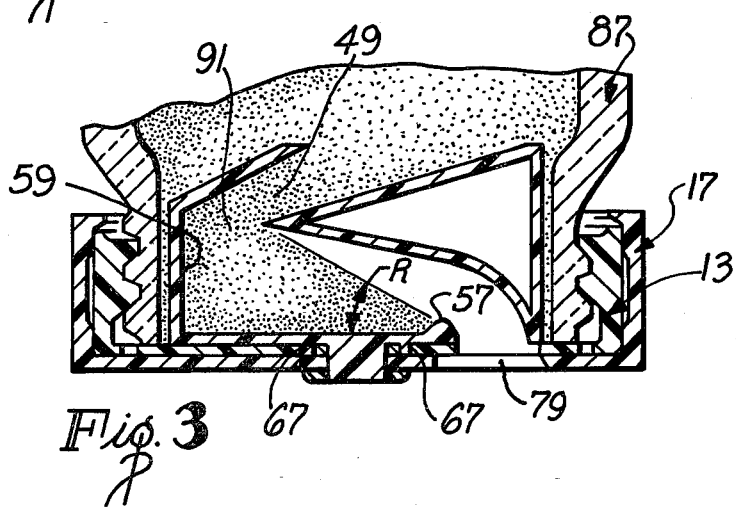
FIG. 3 is a fragmentary sectional view showing the closure with the measuring unit in its loading orientation.

To use the closure 11 to obtain a measured quantity of divided material, the container 87 is turned 180 degrees from the position shown in FIG. 2 to the position shown in FIG. 3. This allows the divided material 91 to flow by gravity through the entrance passage 49 into the receiving chamber 59. Divided material has a known substantially constant angle of repose R (FIG. 3). Accordingly, in the loading position of FIG. 3, a predetermined quantity of the divided material 91 flows into the receiving chamber 59. The projection 57 confines the divided material in the loaded position and provides a sharp cut-off point for the divided material. Thereafter, the container 87 can be rotated through 90 degrees to the position of FIG. 4 to allow the divided material 91 to pass from the receiving chamber 59 through the outlet 79. The interior wall 61 curves to guide the divided material out through the outlet 79.

Although an exemplary embodiment of the invention has been shown and described, many changes, modifications and substitutions may be made by one having ordinary skill in the art without necessarily departing from the spirit and scope of this invention.

I claim:

1. A multiple-function closure for a container for divided material wherein the container has an opening, said closure comprising:
   a first cap having an end wall and means for attaching the first cap to the container so that the end wall can at least partially span the opening of the container, said end wall having opening means extending therethrough;
   a measuring unit;
   means for mounting the measuring unit on one side of the end wall;
   said measuring unit having means responsive to the orientation of the measuring unit for measuring a predetermined volume of the divided material;
   a first portion of said opening means communicating with the measuring unit so that said first portion can receive said predetermined volume of divided material from the measuring unit and a second portion of the opening means passing through said end wall so that said second portion cannot receive said predetermined volume of divided material from the measuring unit;
   a second cap having an outlet therein; and
   means for mounting said second cap on the other side of the first cap for movement relative to the first cap such that the outlet can selectively be placed in a position overlying on imperforate portion of said end wall to define a closed position, or in communication with said first portion of said opening means to define a measured dispensing position, or in communication with said second portion of said opening means to define a non-measured dispensing position.

2. A closure as defined in claim 1 wherein said measuring unit includes a connector member projecting from the measuring unit through the first cap, said mounting means for the measuring unit includes at least one pin projecting from the measuring unit and into the first cap whereby relative rotation between the measuring unit and the first cap is essentially prevented.

3. A closure as defined in claim 1 wherein the measuring unit includes a connector member projecting from the measuring unit through the end wall of the first cap and into the second cap and said mounting means for the second cap includes said connector member, said second cap being mounted on the connector member for rotation relative to the first cap.

4. A closure as defined in claim 1 wherein said mounting means for the second cap mounts said second cap for rotation relative to said first cap and said closure includes detent means for releasably retaining said second cap in at least one of said positions thereof, said detent means includes a projection on said second cap and a cooperating recess on said first cap, said projection being located generally opposite the outlet to urge the surfaces of the caps adjacent the outlet tightly together as the cap is rotated from said one position.

5. A closure as defined in claim 1 wherein said measuring unit has an entrance passage for receiving the divided material and a discharge passage for discharging a measured amount of the divided material from the measuring unit to the first portion of the opening means of the first cap, the minimum dimension of the cross section of the entrance passing being less than the minimum dimension of the discharge passage whereby material entering the measuring unit through the entrance passage can leave the measuring unit through the discharge passage.

6. A closure as defined in claim 1 wherein said attaching means includes a peripheral wall for attaching the first cap to the container, said mounting means for the measuring unit attaches the measuring unit to the first cap to essentially hold the first cap and the measuring unit against rotation relative to each other, said mounting means for the second cap mounts the second cap for rotation relative to the first cap and among said positions of the second cap.

7. A closure as defined in claim 6 wherein said measuring unit is integrally constructed of plastic material, said peripheral wall of the first cap has a free edge, and said second cap includes a peripheral wall of the first cap and a lip projecting from the peripheral wall of the second cap into engagement with the free edge of the peripheral wall of the first cap.

8. A closure as defined in claim 1 wherein said first cap includes a peripheral wall, said mounting means for the measuring unit mounts the measuring unit on the end wall of the first cap with the peripheral wall surrounding the measuring unit and being spaced radially therefrom to provide a gap for receiving a portion of the container which surrounds the opening in the container.

9. A closure as defined in claim 1 wherein said mounting means for the second cap mounts the second cap on the end wall of the first cap for rotation among said positions of the second cap, said second portion of said opening means includes a first opening and a plurality of second openings spaced from said first opening, said second cap being rotatable to selectively provide communication between said outlet and said first opening and said outlet and said plurality of second openings.

10. A multiple-function closure for a container for divided material wherein the container has an opening, said closure comprising:
    a first cap having an end wall and means for attaching the first cap to the container so that the end wall can at least partially span the opening of the container, said end wall having opening means extending therethrough;
    a measuring unit;
    means for mounting the measuring unit on one side of the end wall;
    said measuring unit having means responsive to the orientation of the measuring unit for measuring a predetermined volume of the divided material;
    at least a first portion of said opening means communicating with the measuring unit;
    a second cap having an outlet therein;
    means for mounting said second cap on the other side of the first cap for rotational movement relative to the first cap such that the outlet can selectively be placed in communication with said first portion of said opening means to define a measured dispensing position; and said measuring unit including a connector member projecting from the measuring unit through the first cap, said mounting means for the measuring unit including at least one pin projecting from the measuring unit and into the first cap whereby relative rotation between the measuring unit and the first cap is essentially prevented.

11. A multiple-function closure for a container for divided material wherein the container has an opening, said closure comprising:

a first cap having an end wall and means for attaching the first cap to the container so that the end wall can at least partially span the opening of the container, said end wall having opening means extending therethrough;

a measuring unit;

means for mounting the measuring unit on one side of the end wall;

said measuring unit having means responsive to the orientation of the measuring unit for measuring a predetermined volume of the divided material;

at least a first portion of said opening means communicating with the measuring unit;

a second cap having an outlet therein;

means for mounting said second cap on the other side of the first cap for rotational movement relative to the first cap such that the outlet can selectively be placed in communication with said first portion of said opening means to define a measured dispensing position; and the measuring unit including a connector member projecting from the measuring unit through the end wall of the first cap and into the second cap and said mounting means for the second cap including said connector member, said second cap being mounted on the connector member for rotation relative to the first cap.

* * * * *